(12) United States Patent
Mizell et al.

(10) Patent No.: US 7,289,462 B1
(45) Date of Patent: Oct. 30, 2007

(54) METHOD AND APPARATUS FOR NETWORK-INITIATED CONTEXT ACTIVATION USING DYNAMIC DNS UPDATES

(75) Inventors: Jerry Mizell, Plano, TX (US); David Lauson, McKinney, TX (US); Peter Wenzel, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 996 days.

(21) Appl. No.: 10/034,001

(22) Filed: Dec. 26, 2001

(51) Int. Cl.
*H04Q 7/00* (2006.01)
(52) U.S. Cl. .................... 370/328; 370/401; 709/230
(58) Field of Classification Search ............... None
See application file for complete search history.

(56) References Cited

U.S. PATENT DOCUMENTS

| | | | |
|---|---|---|---|
| 6,961,322 B2* | 11/2005 | Viola et al. ............... 370/328 |
| 2001/0014085 A1* | 8/2001 | Johansson et al. ......... 370/329 |
| 2001/0015977 A1* | 8/2001 | Johansson .................. 370/392 |
| 2002/0138622 A1* | 9/2002 | Dorenbosch et al. ...... 709/227 |
| 2002/0147791 A1* | 10/2002 | Choi ........................ 709/217 |
| 2003/0058813 A1* | 3/2003 | Viola et al. ................ 370/328 |

* cited by examiner

*Primary Examiner*—Bob A. Phunkulh
(74) *Attorney, Agent, or Firm*—Garlick Harrison & Markison; James A. Harrison; Kevin L. Smith

(57) ABSTRACT

A method and apparatus provide for the reservation of dynamic IP addresses to enable a push server to initiate a PDP context as a part of providing push service without timing out. More specifically, in one embodiment of the invention, a push server generates a query to a domain name server to get the subscriber's IP address based upon the provided domain name. In this case, the subscriber is the person that is to receive the push data. The domain name server then generates a message to a dynamic host configuration protocol (DHCP) server to prompt it to reserve a dynamic IP address for the mobile subscriber. The DHCP server then returns the reserved "leased address" to the DNS server to enable it to perform a dynamic DNS update. The DNS server then returns the subscriber address to the push server. The push server then initiates a context activation. A gateway GPRS support node then requests ID information from the DHCP server for the leased address and initiates context activation with the received ID information resulting therefrom.

17 Claims, 4 Drawing Sheets

METHOD AND APPARATUS FOR NETWORK-INITIATED CONTEXT ACTIVATION USING DYNAMIC DNS UPDATES

BACKGROUND OF THE INVENTION

1. Technical Field

The present invention relates generally to mobile communication systems and, more particularly, to general packet radio services for delivering data over a circuit switched telephone network.

2. Description of the Related Art

The general packet radio service (GPRS) is a non-voice value added service that allows information to be sent and received across a mobile telephone network. It supplements, or rides on top, of today's circuit switched data and short message service networks. The theoretical maximum speed of GPRS includes speeds of up to approximately 171.2 kilobits per second (kbps). This maximum speed is achievable in GPRS systems using all eight timeslots at the same time in a time division multiple access (TDMA) context.

This speed is about three times as fast as data transmission speeds possible over today's fixed telecommunication networks and ten times as fast as current circuit switched data services on Global System for Mobile Communications (GSM) standard time division multiple access (TDMA) networks. Thus, GPRS systems are advantageous in that they require less system resources to transmit a fixed amount of data in comparison to using a traditional circuit switched approach. By allowing information to be transmitted more quickly, immediately, and efficiently, across the mobile network, GPRS may well be a relatively less costly mobile data service compared to short message service (SMS) and circuit switched data services.

GPRS also facilitates instant connections in which information can be sent or received immediately as the need arises, subject to radio coverage. No dial up modem connection is necessary. GPRS, similar to some broadband connections for personal computers, often is referred to as being "always connected". Thus, another one of the advantages of GPRS is that data may be transmitted immediately, whenever the need arises. In contrast to circuit switched data networks in which a connection must be established to transmit a data packet or data file, GPRS operation is extremely efficient in those situations in which a small amount of data is to be sent.

As the emphasis of many designs today are to create wireless computer networks, and to connect data devices including personal computers to wireless transceivers and mobile terminals, such a system that provides instantaneous response is very important for time critical applications, and, more generally, for the implementation of wireless computer networks.

For example, a remote credit card authorization system implemented in a wireless network can be greatly improved if it is unnecessary for the customer to wait the amount of time that is required to establish a connection. Anyone that has waited at a cash register for credit authorization while a modem dials in and transmits account information can readily appreciate this advantage.

Additionally, GPRS facilitates the use of Internet applications not only from personal computers, but also from appliances and machines. It is anticipated that appliances will be designed to be coupled to the Internet to facilitate control either onsite or remotely. While some people envision connecting these appliances to a network port by physical lines, it would clearly be advantageous to be able to connect such appliances to the Internet through a wireless link. GPRS will facilitate the creation of Internet controlled appliance networks through a wireless medium.

As suggested before, GPRS involves overlaying a packet based air interface on an existing circuit switched wireless network. For example, the circuit switched wireless network may comprise a GSM network. Accordingly, the user is given an option to utilize a packet based data service. In order to overlay a packet based air interface over a circuit switched network, the GPRS standard defines new infrastructure nodes to minimize the impact to existing networks in terms of hardware and software.

One advantage of GPRS is that the packet switching that results from the infrastructure nodes allows the use of GPRS radio resources only when users actually are sending or receiving data. Unlike traditional circuit switched voice networks, a connection is not continuously reserved for a user for the intermittent transmission of data. This efficient use of scarce radio resources means that larger number of GPRS users To can share the same bandwidth and be served from a single base station or cell. The actual number of users, of course, that may use the system at one time depends on the amount of data being transferred.

A delivery network, for example, either a Universal Mobile Telecommunications System (UMTS) network or a GPRS network, is one that provides connectionless or connection-oriented push services. A push service is the delivery of data or multimedia information from a network node to user equipment for the purpose of activating the user equipment or for providing information from the network. A push service also can include activating a packet data protocol (PDP) context, if necessary. Examples of delivery networks that offer push services include, as stated, the GPRS network, but can also include other equipment, such as a session initiation protocol (SIP) proxy, a push proxy or a short message service (SMS) service center. New services and features being contemplated require that push capabilities be implemented to enable external Internet protocol networks to deliver data to third generation wireless terminals in the paging system (PS) domain.

Some specifications allow operators to provide push services by using static IP addresses or by having long lasting PDP context. However, it would be advantageous to also provide push services within systems that utilize dynamic IP addressing schemes. In other words, push services should be provided to any mobile terminal regardless of whether it has a static or dynamic IP address. In order to use dynamic IP addresses, however, it is necessary for the network to be able to initiate a PDP context for a mobile subscriber.

In GPRS and UMTS networks, however, a network-initiated PDP context activation is not practical unless a static IP address is allocated for the subscriber. The use of static IP address assignments is cumbersome, however, because it wastes available address space for mobile subscribers that are inactive. Thus, it is desirable to initiate PDP context activation with dynamic address assignments. One problem, however, with having network initiated PDP context activation with dynamic address assignment is that a push server is likely to time out prior to the completion of the network initiated PDP context activation because of the all the steps that must be followed in a dynamic address environment.

There is a need, therefore, for a system and method that provides for push services in a dynamic IP address environment.

SUMMARY OF THE INVENTION

A method and apparatus provide for the reservation of dynamic IP addresses to enable a push server to initiate a PDP context as a part of providing push service without timing out. More specifically, in one embodiment of the invention, a push server generates a query to a domain name server to get the subscriber's IP address based upon the provided domain name. In this case, the subscriber is the person that is to receive the push data. The domain name server then generates a message to a to dynamic host configuration protocol (DHCP) server to prompt it to reserve a dynamic IP address for the mobile subscriber. The DHCP server then returns the reserved "leased address" to the DNS server to enable it to perform a dynamic DNS update. The DNS server then returns the subscriber address to the push server.

This process enables the push server to send the message (i.e., push data) to a gateway GPRS support node (GGSN) for delivery to the subscriber. The GGSN sees the incoming packet(s) and queries the DHCP server for information that relates to the received address. The DHCP server then returns the subscriber information for the leased address to the GGSN. The GGSN, in turn, is able to use the subscriber information to locate a corresponding serving GPRS support node (SGSN) to which the mobile is attached and to initiate context activation procedures so that the push service may be completed.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
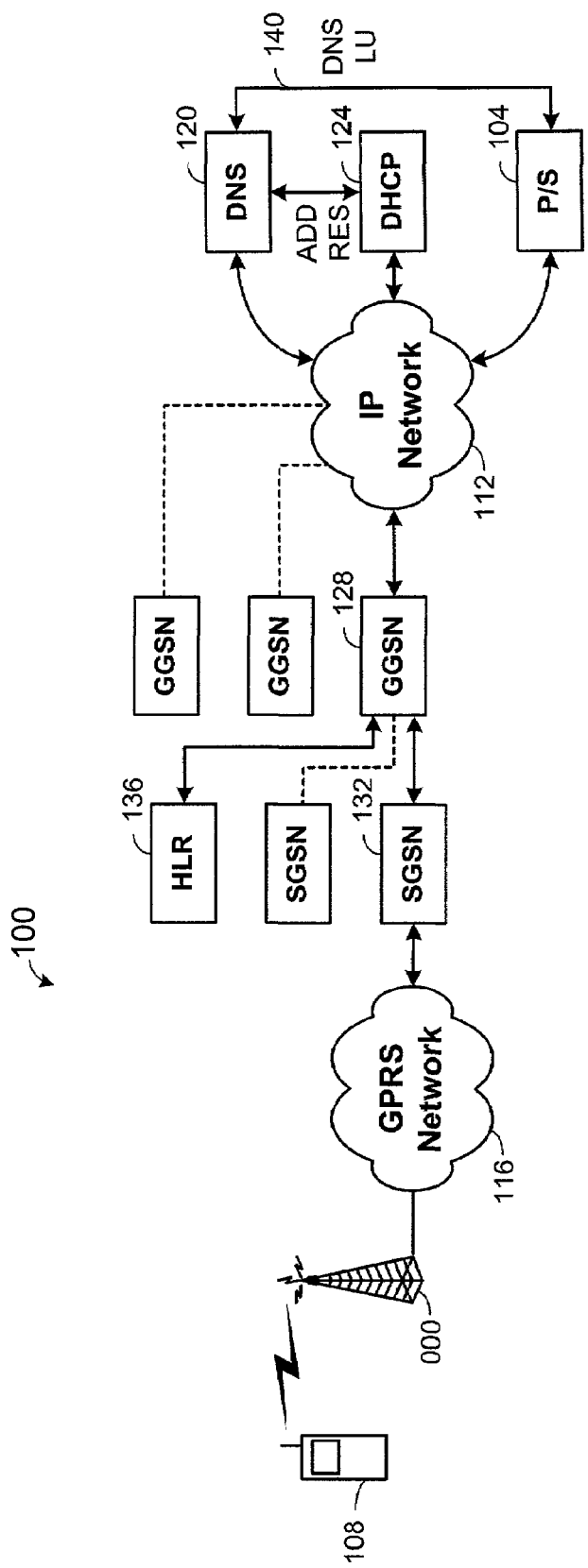
FIG. 1 is a functional block diagram of a communication network formed according to one embodiment of the present invention.

FIG. 1 is a functional block diagram of a communication network formed according to one embodiment of the present invention. More specifically, referring to network 100, a push server 104 provides push services to deliver data to a mobile terminal 108 by way of an IP network 112 and a GPRS network 116. As may also be seen, a domain name server (DNS) 120 and a DHCP server 124 are also coupled to IP network 112.

The dynamic host configuration protocol (DHCP) is a TCP/IP protocol that enables personal computers and workstations to obtain temporary or permanent IP addresses to use for routing communication signals. Typically a DHCP server communicates with the DHCP clients to dynamically assign IP addresses to nodes whenever needed. DHCP supports manual, automatic and dynamic address assignment and provides the client sub-net mask gateway addresses and domain name server addresses. A DHCP server verifies a device identity and "leases" it an IP address on a dynamic basis for use for a specified amount of time. Thereafter, the leased address is reclaimed for reassignment.

A domain naming system includes a plurality of distributed databases that translate computer names to specific IP addresses. A typical DNS server facilitates use of the Internet without requiring memory or one to remember a long list of numbers. Thus, DNS servers and the DNS system make it easy to remember an address of a particular destination.

IP network 112 also is coupled to a plurality of GGSNs, including GGSN 128. GGSN 128 forms the gateway between IP network 112 and GPRS network 116 that is presently serving mobile terminal 108. Mobile terminal 108 is a GPRS-capable and voice-capable mobile terminal. Continuing to examine FIG. 1, GGSN 128 also is coupled to an SGSN 132 that is the serving GPRS support node for mobile terminal 108. GGSN 128 also is coupled to an HLR 136. In the diagram shown, other SGSNs and GGSNs are shown being coupled to network 100 by way of dashed lines merely to show their presence but that they are not providing any communication support for the present example and, more particularly, for mobile terminal 108. Each of the GGSNs, SGSNs and the HLR 136 are a part of GPRS network 136 but are broken out to illustrate their specific operation according to the present invention.

In operation, push server 104 generates a query to DNS 120 to obtain the IP address for mobile terminal 108 whenever push server 104 needs to deliver data to mobile terminal 108. Thus, as is shown in FIG. 1, push server 104 generates the message to DNS 120 by way of a communication path 140. It is understood, of course, communication path 140 may be either a dedicated connection or a connection through IP network 112 to which both push server 104 and DNS 120 are both coupled.

DNS 120, upon receiving the query from push server 104, sends a message to DHCP server 124 effectively to reserve an address for mobile terminal 108. The signaling between DNS 120 and DHCP server 124 may be implemented in a variety of ways. The effect of such signaling, however, is to prompt DHCP server 124 to reserve (lease) a dynamic IP address for mobile terminal 108. Thereafter, DHCP server 124 returns the leased address to DNS 120 thereby allowing DNS 120 to perform a dynamic DNS update. DNS 120 then returns the leased address to push server 104.

Once push server 104 receives the leased address, it pushes the data to GGSN 128 through IP network 112 for delivery to mobile terminal 108. Of course, by pushing data, what is meant is that the push server generates a data message that is transmitted to the GGSN 128 for delivery to mobile terminal 108.

GGSN 128, upon receiving the push message (typically a packet) queries the DHCP server to obtain information that corresponds to the leased address that was received with the push message. The GGSN, upon receiving the subscriber information from mobile terminal 108 that corresponds to the leased address from DHCP 124, utilizes the subscriber information to locate the SGSN that supports mobile terminal 108. In the present example, GGSN 128 communicates with an HLR 136 and provides the subscriber information to HLR 136 to determine that SGSN 132 is one that is presently serving mobile terminal 108. Once SGSN 132 is identified by GGSN 128, standard context activation procedures are implemented to create the active context for the push data that is to be delivered to mobile terminal 108.

Figure 2:
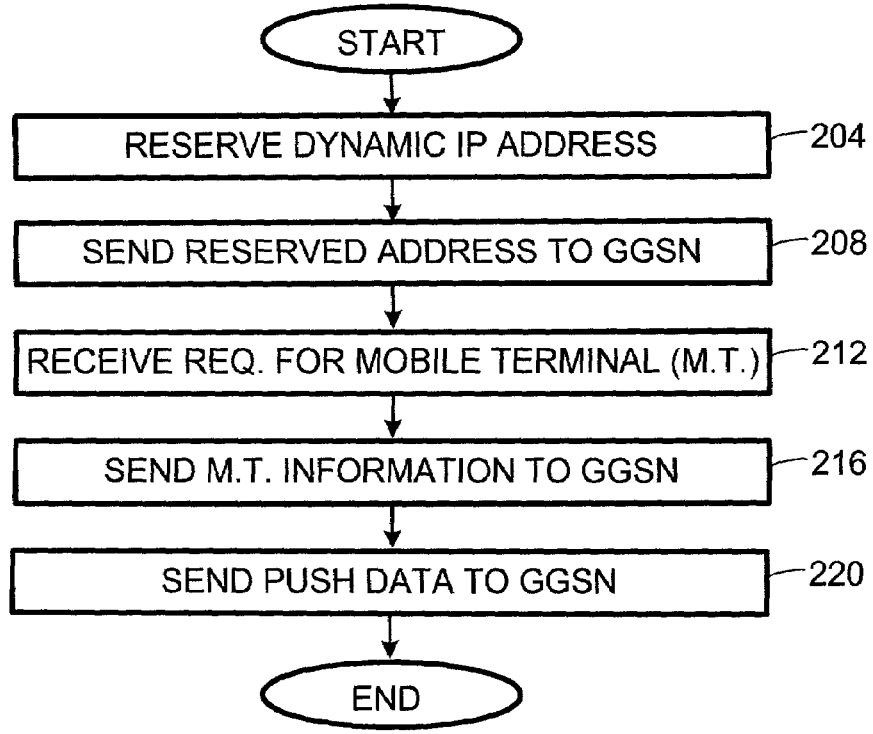
FIG. 2 is a flowchart that illustrates a method for context activation by a push server according to one embodiment of the present invention.

FIG. 2 is a flowchart that illustrates a method for context activation by a push server according to one embodiment of the present invention. Initially, a push server reserves a dynamic IP address (step 204). As has been described in relation to FIG. 1, the push server reserves the dynamic IP address by generating a DNS look-up request to a DNS, such as DNS 120. In the described embodiment, the push server generates a DNS look-up request to a DNS server to serve as the look-up request. In the inventive system the DNS look-up request prompts the DNS to reserve the dynamic IP address for a mobile terminal that is to receive push data. Thus, the reference to transmitting a DNS look-up request is synonymous with a request for a reservation for a dynamic IP address in the described embodiment. In another embodiment of the invention, steps 208 and 212 occur between the GGSN and the DHCP. In other words, the push server does not receive the request for the mobile terminal information and therefore does not provide it.

After transmitting the request to reserve a dynamic IP address, the next step in the invention includes receiving and then transmitting the reserved address to a GGSN (step 208). Once the push server has transmitted the reserved (leased) dynamic IP address to the GGSN, it receives a request from the GGSN for mobile terminal information that corresponds to the reserved dynamic IP address (step 212).

Responsive thereto, the push server sends the mobile terminal information to the GGSN (step 216). After transmitting the reserved address to the GGSN, a session is initiated, or a context is activated, thereby enabling the push server to transmit the push data to the GGSN (step 220).

Figure 3:
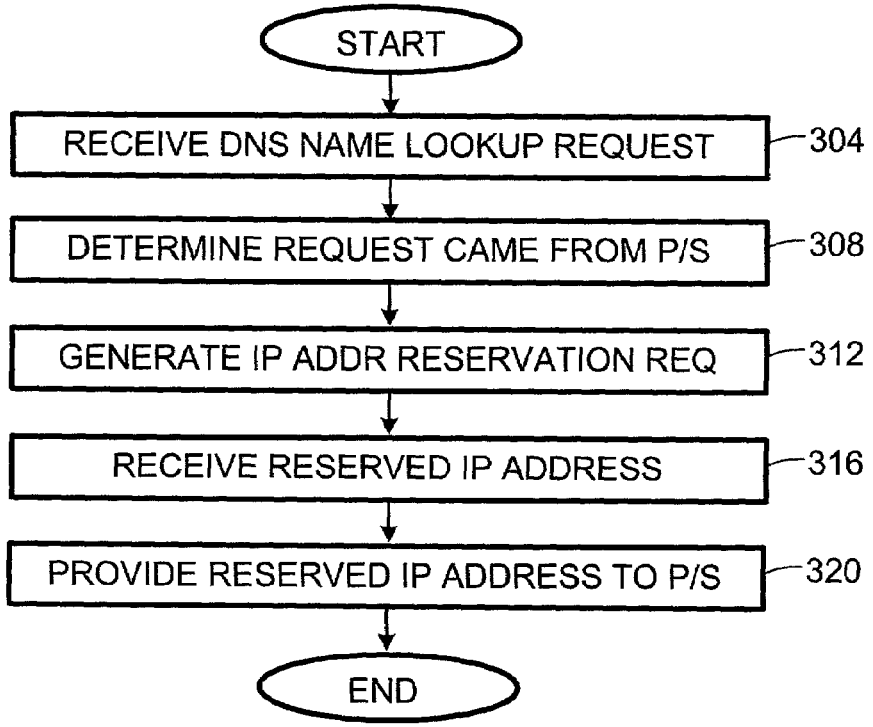
FIG. 3 is a flowchart that illustrates a method performed by a domain name server according to one embodiment of the present invention.

FIG. 3 is a flowchart that illustrates a method performed by a domain name server according to one embodiment of the present invention. Initially, a domain name server receives a DNS look-up request (step 304). Thereafter, the domain name server determines that the request came from a push server (step 308). Thereafter, the domain name server generates an IP address reservation request that is transmitted to a DHCP server (step 312). Responsive to generating the IP reservation request, the domain name server receives a reserved IP address from the DHCP server (step 316). Responsive thereto, the domain name server provides the received IP address to the push server (step 320). As has been explained elsewhere in here, the reserved IP address typically is a dynamic IP address assignment that is temporary and is only good for a specified amount of time.

Figure 4:
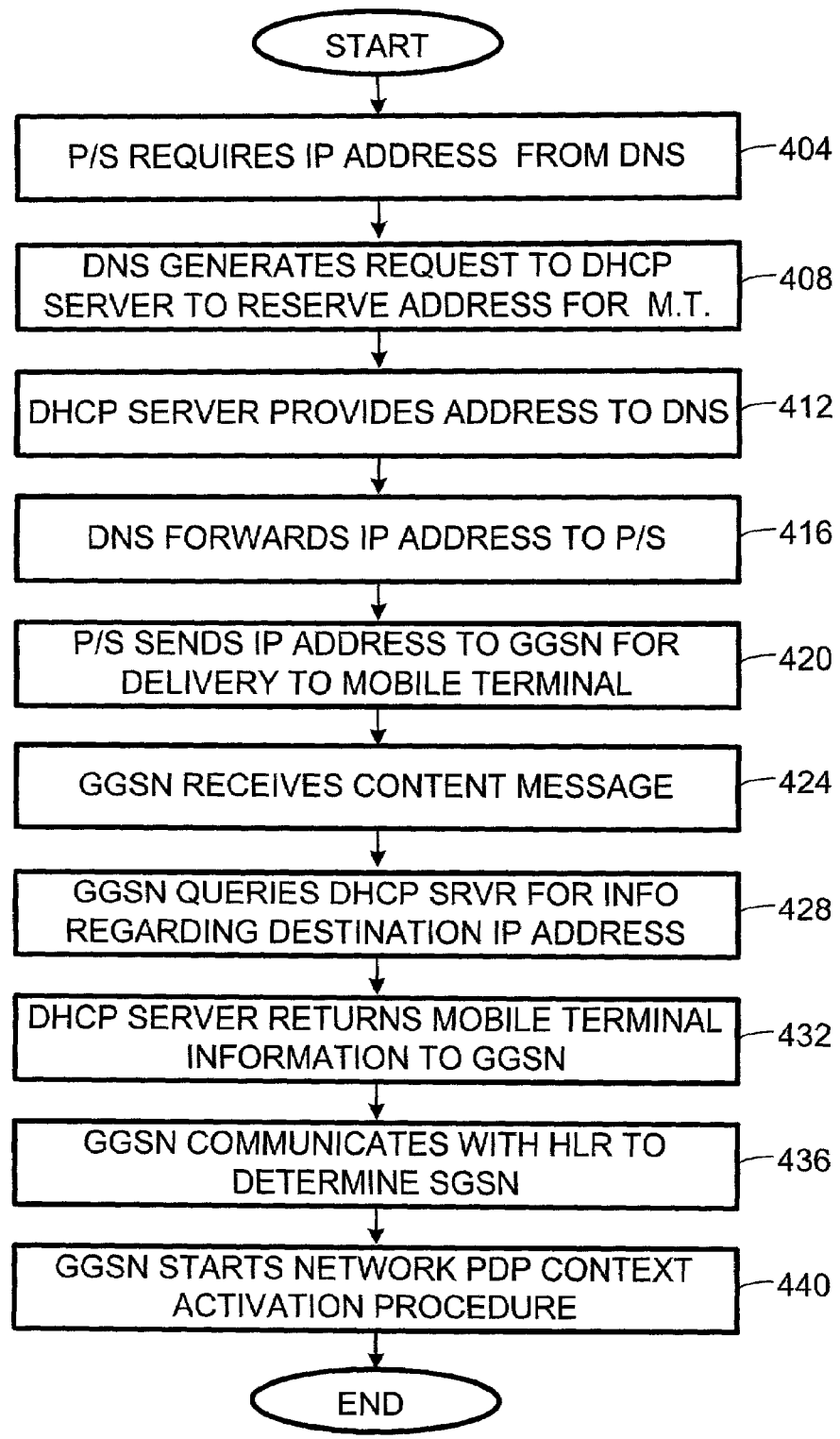
FIG. 4 is a flowchart illustrating a network-wide method for establishing context activation, including the reservation of dynamic IP addresses to enable a push server to transmit data to a mobile terminal according to one embodiment of the present invention.

FIG. 4 is a flowchart illustrating a network-wide method for establishing context activation, including the reservation of dynamic IP addresses to enable a push server to transmit data to a mobile terminal according to one embodiment of the present invention. Referring now to FIG. 4, a push server initially requests an IP address from a DNS (step 404). Responsive thereto, the DNS generates a request to a DHCP server to reserve an address for a mobile terminal (step 408). The DHCP server then provides (leases) the address to the DNS (step 412). As has been explained elsewhere herein, the address is a temporary dynamic IP address. The DNS then forwards the reserved IP address to the push server (step 416).

The above listed steps for the method of FIG. 4 are those steps that relate to establishing or reserving a temporary IP address as a part of context activation. Accordingly, once an IP address has been reserved, the push server sends the temporary IP address to a GGSN to which it is coupled for delivery of push data to a mobile terminal (step 420). The GGSN then receives the context message (step 424). The GGSN, upon receiving the push data or context message that is to be delivered to the mobile terminal for whom the temporary ID address has been reserved, queries the DHCP server for information regarding the destination mobile terminal for whom the temporary IP address has been reserved (step 428).

The DHCP server, upon receiving the query from the GGSN, returns information to the GGSN that relates to the mobile terminal (step 432). Based upon the mobile terminal information, the GGSN communicates with an HLR to determine the serving GPRS support node (step 436). Specifically, the GGSN generates ID information to the HLR to determine the serving GPRS support node. Once the GGSN receives a reply from the HLR and has identified the SGSN that is supporting the mobile terminal, the GGSN starts a network-initiated PDP context activation procedure (step 440). This network-initiated PDP context activation procedure is the actual GPRS network setup that includes the identified SGSN that allows for delivery of the push data from the push server to the mobile terminal.

Figure 5:
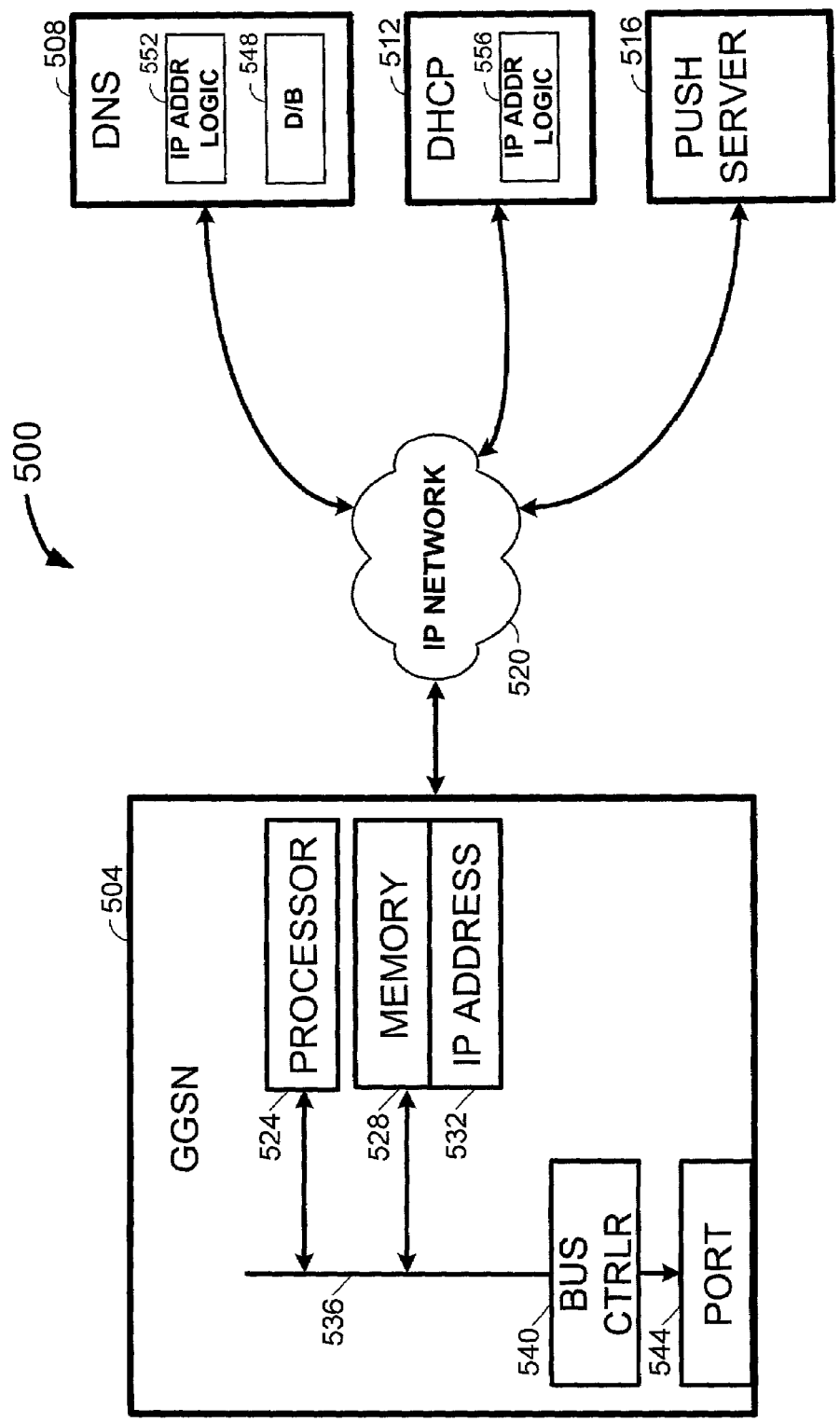
FIG. 5 is a functional block diagram that illustrates a network for allowing a push server to transmit push data to a destination mobile terminal according to one embodiment of the present invention.

FIG. 5 is a functional block diagram that illustrates a network for allowing a push server to transmit push data to a destination mobile terminal according to one embodiment of the present invention. Referring now to FIG. 5, a network 500 includes a GGSN 504 that is coupled to communicate with a DNS 508, a DHCP server 512, and a push server 516, all by way of an IP network 520. Each of the GGSN 504, DNS 508 and DHCP server 512 are formed to include logic that supports the inventive processes described herein. Thus, referring specifically to GGSN 504, it may be seen that it includes a processor 524 and a memory 532 that are coupled to communicate with each other by way of an internal bus 536. Memory 532 includes computer instructions that define the logic for the GGSN 504 to communicate with other network elements to support the inventive processes described herein. A bus controller 540 also is coupled to bus 536 and controls the communications thereon, including the transmission of the computer instructions from memory 532 to processor 524. Bus controller 540 also is coupled to a network port 544 through which GGSN 504 communicates with external devices, such as IP network 520.

DNS 508 includes a database 548 that maps domain names to IP addresses. Additionally, DNS 508 includes IP addressing logic that enables it to operate according to the methods described herein. As may be seen, DNS 508 specifically includes an IP address logic module 552. It should be understood that the IP address logic module 552, as well as all the logic described herein, may either be formed in hardware by state logic, field programmable gate arrays, etc., or it may be created by computer instructions stored in memory and executed by a process similar to GGSN 504.

DHCP server 512, similarly, includes IP addressing logic module 556 that enables it to operate according to the methods described herein. More specifically, IP address logic module 556 within DHCP server 512 defines the operational logic that prompts the DHCP server 512 to reserve temporary IP addresses as described herein. As with DNS 508 and, more specifically, with IP address logic 552 of DNS 508, IP address logic 556 of DHCP server 512 may be formed in hardware or software.

Finally, the network of FIG. 5 includes push server 516 that communicates with DNS 508 and GGSN 504 by way of IP network 520 to reserve a temporary IP address and to establish context activation for the delivery of push data to a mobile terminal. Push server 516 includes logic to prompt DNS 508 to reserve a dynamic IP address for push data that is to be transmitted to a mobile terminal.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. As may be seen, the described embodiments may be modified in many different ways without departing from the scope or teachings of the invention. For example, any combination of the described methods may be combined to facilitate the reservation of temporary and dynamic IP addresses to enable push servers to establish a context with mobile terminals in a network that utilizes a dynamic IP addressing scheme.

The invention claimed is:

1. A method in a network for wireless communications for pushing data through a data packet network utilizing a dynamic addressing scheme, comprising:
   transmitting, from a push server to a domain name server ("DNS"), a look up signal for a specified domain name;
   transmitting a reservation signal from the DNS to a dynamic host configuration protocol ("DHCP") server to prompt the DHCP server to reserve a dynamic Internet Protocol ("IP") address that pertains to the specified domain name, wherein the specified domain name corresponds to a mobile terminal;
   receiving the reserved dynamic IP address at the push server; and
   activating a context, based upon the reserved dynamic IP address, through the data packet network.

2. The method of claim 1 further including the step of transmitting the reserved dynamic IP address for the mobile terminal that corresponds to the specified domain name from the DHCP server to the DNS.

3. The method of claim 2 further including the step of transmitting the reserved dynamic IP address from the DNS to the push server after receiving a signal requesting that a dynamic IP address be reserved.

4. The method of claim 3 wherein the received signal requesting that a dynamic IP address be reserved is in the form of a DNS lookup request signal.

5. The method of claim 1 wherein the step of activating a context includes the step, in a Gateway GPRS Support Node ("GGSN"), of receiving push data for the mobile terminal and also receiving the reserved dynamic IP address from the push server.

6. The method of claim 5 further including the step of transmitting the reserved IP address to a DHCP server to obtain a mobile station ID.

7. The method of claim 6 further including the step of transmitting the received mobile station ID from the DHCP server to a home location register to determine the identity of a serving GPRS support node whereby the context activation is established with the identified serving GPRS support node.

8. A method in a Gateway GPRS Support Node ("GGSN") for pushing data through a data packet network utilizing a dynamic addressing scheme, comprising:
   receiving a reserved dynamic Internet Protocol ("IP") address and push data from a push server;
   transmitting a request for identification ("ID") information to a dynamic host configuration protocol ("DHCP") server relating to the reserved dynamic IP address;
   receiving the requested ID information; and
   activating a context through the data packet network so that the push data may be transmitted to its destination having the reserved dynamic IP address.

9. The method of claim 8 further including the step of transmitting a request to an home location register ("HLR") to identify a serving GPRS support node that is presently serving the destination for which the reserved dynamic IP address was reserved and to which the requested ID information corresponds.

10. The method of claim 9 further including the step of activating the context and transmitting the push data to the identified serving GPRS support node.

11. A gateway GPRS support node ("GGSN"), comprising:
   circuitry for receiving push data in a data packet network, wherein the push data includes a reserved dynamic Internet Protocol ("IP") address; and
   circuitry for prompting a dynamic host configuration protocol ("DHCP") server to provide identification ("ID") information that corresponds to the reserved dynamic IP address prior to a context being activated, and activating a context through the data packet network so that the push data may be transmitted to its destination having the reserved dynamic IP address.

12. The GGSN of claim 11 further including circuitry for delaying the activation of the context until the ID information is received from the DHCP server.

13. The GGSN of claim 11 further including circuitry for generating a request to a home location register to request the identity of a serving GPRS support node ("SGSN") that is presently supporting the destination mobile terminal for the push data.

14. The GGSN of claim 13 further including circuitry for delaying the activation of context until a response is received from the home location register identifying the SGSN.

15. A domain name server, comprising:
   circuitry for receiving a domain name lookup request from a push server to determine an IP address that corresponds to a received domain name; and
   circuitry for transmitting a request to a dynamic host configuration protocol ("DHCP") server to prompt it to temporarily reserve a dynamic Internet Protocol ("IP") address for delivery of push data to a mobile terminal by activating a context through the data packet network so that the push data may be transmitted to its destination having the reserved dynamic IP address.

16. The domain name server of claim 15 further including circuitry for receiving a reserved dynamic IP address from the DHCP server that corresponds to the received domain name.

17. The domain name server of claim 16 further including logic to generate the received reserved dynamic IP address to the push server.

* * * * *